US011283598B2

(12) United States Patent
Zeh et al.

(10) Patent No.: US 11,283,598 B2
(45) Date of Patent: Mar. 22, 2022

(54) SELECTIVE REAL-TIME CRYPTOGRAPHY IN A VEHICLE COMMUNICATION NETWORK

(71) Applicant: Infineon Technologies AG, Neubiberg (DE)

(72) Inventors: Alexander Zeh, Munich (DE); Marcus Janke, Munich (DE)

(73) Assignee: Infineon Technologies AG

( * ) Notice: Subject to any disclaimer, the term of this patent is extended or adjusted under 35 U.S.C. 154(b) by 413 days.

(21) Appl. No.: 16/257,840

(22) Filed: Jan. 25, 2019

(65) Prior Publication Data
US 2020/0244442 A1 Jul. 30, 2020

(51) Int. Cl.
*H04L 9/06* (2006.01)
*H04L 29/06* (2006.01)

(52) U.S. Cl.
CPC .......... *H04L 9/0643* (2013.01); *H04L 9/0662* (2013.01); *H04L 63/205* (2013.01); *H04L 2209/84* (2013.01)

(58) Field of Classification Search
CPC .... H04L 9/0643; H04L 9/0662; H04L 63/205
USPC ...................................................... 713/170
See application file for complete search history.

(56) References Cited

U.S. PATENT DOCUMENTS

| 8,090,873 | B1* | 1/2012 | Wookey | H04L 67/2823 |
| | | | | 709/246 |
| 2012/0089842 | A1* | 4/2012 | Yao | H04L 9/3242 |
| | | | | 713/175 |
| 2014/0279874 | A1* | 9/2014 | Reiter | G06F 11/3414 |
| | | | | 707/610 |
| 2014/0331100 | A1* | 11/2014 | Dhuse | G06F 16/215 |
| | | | | 714/752 |

OTHER PUBLICATIONS

Yen, Chih-Hsu, et al. "Simple Error Detection Methods for Hardware Implementation of Advanced Encryption Standard" IEEE Transactions on Computers, vol. 55, No. 6 (Jun. 2006), pp. 720-731.
Bertoni, Guido, et al. "Error Analysis and Detection Procedures for a Hardware Implementation of the Advanced Encryption Standard" IEEE Transactions on Computers, vol. 52, No. 4 (Apr. 2003), pp. 492-505.

\* cited by examiner

*Primary Examiner* — Abiy Getachew
*Assistant Examiner* — Phuc Pham
(74) *Attorney, Agent, or Firm* — Design IP

(57) ABSTRACT

A data message authentication system in a vehicle communication network includes a sequence generator configured to generate a sequence representative of an intra-message pattern; a parsing processor configured to receive a data message, receive the sequence from the sequence generator, select a subset of data segments from the data message based on the intra-message pattern, and output the selected subset of data segments; and a tag generator configured to receive the selected subset of data segments from the parsing processor and generate an authentication code based on the selected subset of data segments, where the authentication code corresponds to the data message.

23 Claims, 4 Drawing Sheets

SELECTIVE REAL-TIME CRYPTOGRAPHY IN A VEHICLE COMMUNICATION NETWORK

FIELD

The present disclosure relates generally to verifying data messages sent in a communication network.

BACKGROUND

Functional safety of electronic systems in automotive vehicles is an important topic in the light of increasing automation and semiconductor content of modern vehicles. It is desirable to have a reliable and safe functionality for the safety critical parts deployed in the system.

In addition to functional safety, cybersecurity has become an important aspect in vehicle electronics systems. It is inevitable to include both functional safety and automotive cybersecurity from the beginning of an electronic product design. Functional safety has reached a level of maturity, but cybersecurity is relatively new. Security parts may soon be required to be both safe and secure. In addition, it may be desirable to enable vehicle communication networks to verify the integrity of the data being transmitted through the network by use of Message Authentication Codes (MACs). However, this authentication process of verifying the integrity of information packages may result in a lower data throughput and or higher computational footprint.

Therefore, an improved system capable of selecting between a higher data throughput and a higher security may be desirable.

SUMMARY

Embodiments relate to authentication system in which one or more devices are paired to an authentication device by sensor fingerprinting, and to methods for performing the same.

According to one or more embodiments, a data message authentication system in a vehicle communication network is provided. The data message authentication system includes a random sequence generator configured to generate a random bit sequence representative of a randomized intra-message pattern; a parsing processor configured to receive a data message, receive the random bit sequence from the random sequence generator, select a subset of data segments from the data message based on the randomized intra-message pattern, and output the selected subset of data segments; and a tag generator configured to receive the selected subset of data segments from the parsing processor and generate an authentication code based on the selected subset of data segments, where the authentication code corresponds to the data message.

According to one or more embodiments, another data message authentication system in a vehicle communication network is provided. The system includes a sender device configured to send at least one data message. The sender device includes a first random sequence generator configured to generate a first random bit sequence representative of a randomized intra-message pattern; a first parsing processor configured to receive the first data message of the at least one data message, receive the first random bit sequence from the first random sequence generator, select a subset of data segments from the first data message based on the randomized intra-message pattern, and output the selected subset of data segments; a first tag generator configured to receive the selected subset of data segments from the first parsing processor and generate a first authentication code based on the selected subset of data segments, wherein the first authentication code corresponds to the first data message; and a transmitter configured to transmit the first data message with the first authentication code.

According to one or more embodiments, another data message authentication system in a vehicle communication network is provided. The system includes a receiver device configured to authenticate a plurality of data messages. The receiver device includes a receiver configured to receive a data message of the plurality of data messages with an authentication code that corresponds to the data message; a first random sequence generator configured to generate a first random bit sequence representative of a randomized intra-message pattern; a first parsing processor configured to receive the data message, receive the first random bit sequence from the first random sequence generator, select a subset of data segments from the data message based on the randomized intra-message pattern, and output the selected subset of data segments; a tag generator configured to receive the selected subset of data segments from the first parsing processor and generate a recalculated authentication code based on the selected subset of data segments, wherein the recalculated authentication code corresponds to the data message; and a comparator configured to compare the authentication code from the receiver with the recalculated authentication code to generate a comparison result, and generate a validation signal based on the comparison result.

According to one or more embodiments, a method of authenticating data messages in a vehicle communication network is provided. The method includes generating, at a sender device, a first random bit sequence representative of a randomized intra-message pattern; selecting, at the sender device, a subset of data segments from a data message based on the randomized intra-message pattern, and output the selected subset of data segments; generating, at the sender device, an authentication code based on the selected subset of data segments, wherein first authentication code corresponds to the data message; and transmitting, from the sender device, the data message with the authentication code.

According to one or more embodiments, another data message authentication system in a vehicle communication network is provided. The system includes a receiver device configured to authenticate a plurality of data messages. The receiver device includes a receiver configured to receive the plurality of data messages and a plurality of authentication codes, each of the plurality of data messages having a corresponding authentication code attached therewith; a random sequence generator configured to generate a random bit sequence representing randomized inter-message pattern; a parsing processor configured to receive the plurality of data messages, select a subset of data messages from the plurality of data messages for authentication based on the randomized inter-message pattern, and select a subset of corresponding authentication codes from the plurality of authentication messages based on the randomized inter-message pattern; a tag generator configured to receive the subset of data messages, and generate a recalculated corresponding authentication code for each data message of the subset of data messages; and a comparator configured to compare each recalculated corresponding authentication code with the corresponding authentication code from the subset of corresponding authentication codes to generate a comparison result, and generate a validation signal based on the comparison result.

BRIEF DESCRIPTION OF THE DRAWINGS

Embodiments are described herein making reference to the appended drawings.

DETAILED DESCRIPTION

Figure 1:
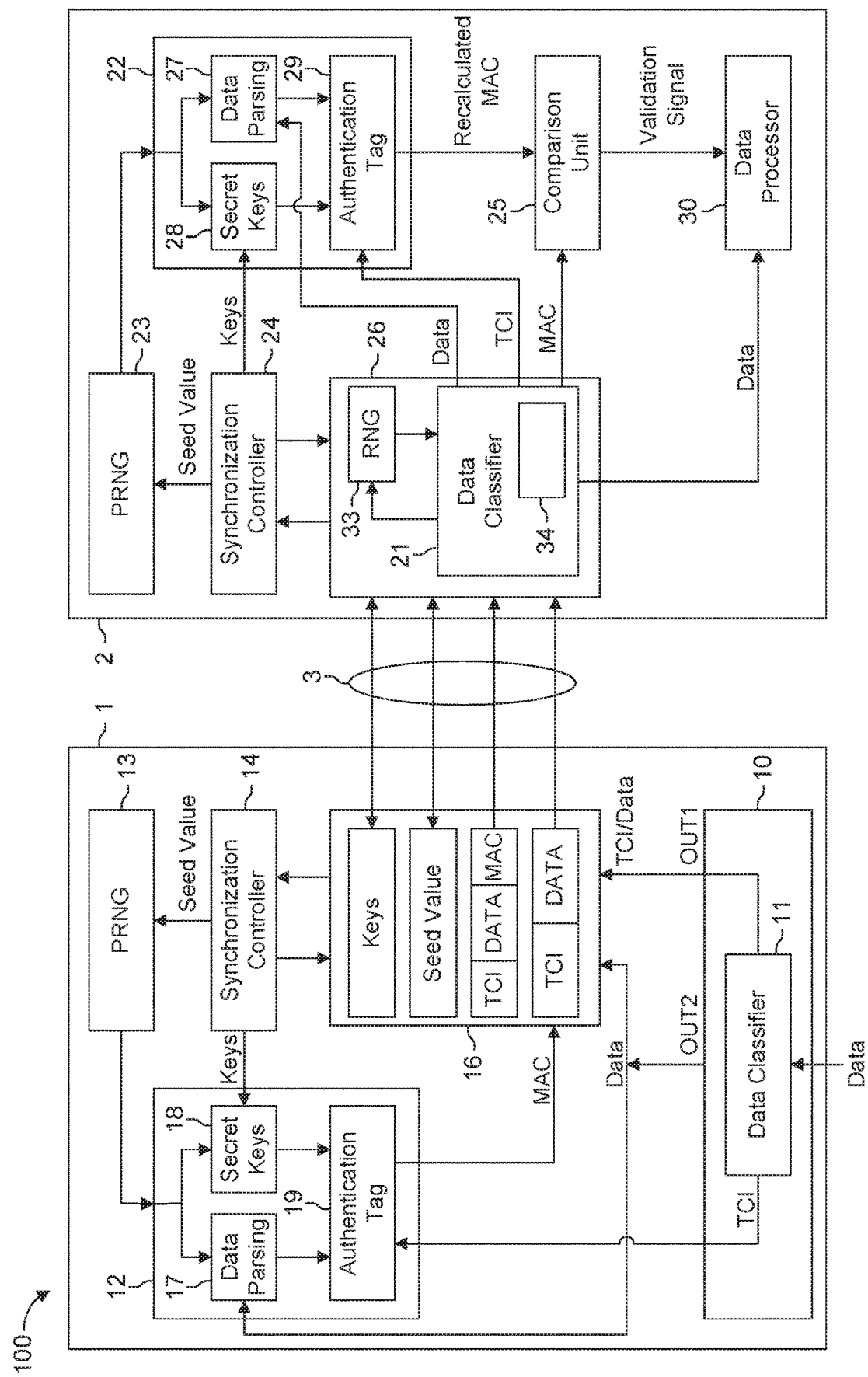
FIG. 1 shows a block diagram of a communication system employing message verification schemes according to one or more embodiments.

In the following, a plurality of details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise. For example, variations or modifications described with respect to one of the embodiments may also be applicable to other embodiments unless noted to the contrary. Optional elements or elements that are capable of being activated and deactivated may be illustrated via the use of dashed lines and blocks in the figures.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

It will be appreciated that the terms "microprocessors", "processors", "processor cores", "processing units", and "processing circuitry" may be used interchangeably throughout this disclosure. A processor may include dedicated hardware for processing, storing, and/or distributing data and information. Two or more processors may also be combined to perform a processing function and may be regarded as a processor.

Processing may include specialized processing functions, including parsing, generating, signing, decrypting, determining, verifying, and comparing. For example, data or information may be parsed by selecting data or information and forwarding the selected data or information according to a particular data path. Multiple data paths may also exist on which different data or information is forward along different data paths. Processing may also include generating checksum values, including hash values and Message Authentication Code (MAC) values. Processing may also include encrypting or decrypting data or information.

Signal conditioning, as used herein, refers to a type of processing used for manipulating an analog signal or a digital signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make an output suitable for further processing after conditioning. For example, an analog output of a sensor may undergo signal conditioning to prepare the output for further processing.

A logic block may include one or more processors and/or other logic circuitry configured to receive and process one or more inputs to generate an output. In particular, a logic block may be any computational device such as a processor, a central processing unit (CPU), a cryptographic engine, computing system, or the like.

Embodiments relate to Electronic Control Units (ECUs) and vehicle communication networks (e.g., Controller Area Networks (CANs), CAN with Flexible Data-Rate (CAN FD), Ethernet (ETH), Peripheral Component Interconnect Express (PCIe), or another bus standard). An ECU is any embedded system in automotive electronics that controls one or more of the electrical systems or subsystems in a vehicle. Each ECU includes a microcontroller (i.e., a microcontroller unit (MCU)), a memory, various inputs (e.g., supply voltage, digital inputs, and/or analog inputs) and outputs (e.g., relay drivers, H bridge drivers, injector drivers, and/or logic outputs), and communication links. Thus, the ECUs are the nodes of in-vehicle automotive networks, while the edges of those networks are communication networks (e.g., CAN, CAN FD, ETH, PCIe, etc.). Selective real-time cryptography according to the embodiments described herein is an extension of MCU hardware of an ECU that adds safety functionality to a security block.

A non-exhaustive list of ECU types includes an Electronic Control Unit, an Engine Control Module (ECM), an Engine Control Unit, a Transmission Control Unit (TCU), a Transmission Control Module (TCM), a Brake Control Module (BCM or EBCM), a Central Control Module (CCM), a Central Timing Module (CTM), a General Electronic Module (GEM), a Body Control Module (BCM), a Suspension Control Module (SCM), a Door Control Unit (DCU), an Electric Power Steering Control Unit (PSCU), a Human-Machine Interface (HMI), a Seat Control Unit, a Speed Control Unit (SCU), a Telematic Control Unit (TCU), and a Battery Management System (BMS). Sometimes the functions of the Engine Control Unit and the TCU are combined into a single ECU called a Powertrain Control Module (PCM). In addition, the BCM may be configured to control an anti-lock braking system (ABS), electronic stability control (ESC), and/or dynamic stability control (DSC).

One or more ECUs may also be connected to one or more sensors via the communication network to receive sensor data. A sensor may be an image sensor, a time-of-flight (ToF) sensor, a Light Detection and Ranging (LIDAR) sensor, a camera sensor, a radar sensor, a magnetic field sensor, an electric field sensor, a pressure sensor, a temperature sensor, a current sensor, a voltage sensor, or any other type of sensor integrated within a vehicle. Thus, an ECU may generate data messages based on sensor data to transmit within the communication network.

Embodiments further relate to checksums and hash values used to verify an authenticity of in-vehicle communications. A checksum is a small-sized datum derived from a block of digital data (e.g., a message) for the purpose of detecting errors which may have been introduced during its transmission or storage. The actual procedure which yields the checksum from a data input is called a checksum function or checksum algorithm. Depending on its design goals, a good checksum algorithm will usually output a significantly different value, even for small changes made to the input. This is especially true for cryptographic hash functions, which is a type of checksum function that may be used to detect many data corruption errors and verify overall data integrity. A checksum function is deterministic so the same message always results in the same checksum value. It is difficult to find two different messages with the same checksum value. Thus, if the computed checksum for the current data input matches a stored value of a previously computed checksum, there is a very high probability the data has not been altered, tampered with, or corrupted. Checksum functions are related to hash functions, fingerprints, randomization functions, and cryptographic hash functions.

A hash function is any function that can be used to map data of arbitrary size to data of a fixed size. The values returned by a hash function are called hash values, hash codes, digests, or simply hashes, and may include MAC hashes and HMAC hashes described below. A hash function is deterministic so that the same message always results in the same hash. Thus, it is infeasible to find two different messages with the same hash value.

A cryptographic hash function allows one to easily verify that some input data maps to a given hash value, but if the input data is unknown, it is deliberately difficult to reconstruct it (or any equivalent alternatives) by knowing the stored hash value. This is used for assuring integrity of transmitted data, and is the building block for Hash-Based Message Authentication Codes (HMACs), which provide message authentication.

A MAC algorithm or function is a symmetric key cryptographic technique to provide message authentication. For establishing a MAC process, the sender and receiver share a symmetric key used for generating a MAC at both the sender and the receiver. While MAC functions are similar to cryptographic hash functions, they possess different security requirements. To be considered secure, a MAC function must resist existential forgery under chosen-plaintext attacks. This means that even if an attacker has access to an oracle which possesses the secret key and generates MACs for messages of the attacker's choosing, the attacker cannot guess the MAC for other messages (which were not used to query the oracle) without performing infeasible amounts of computation. MACs differ from digital signatures as MAC values (i.e., MAC hashes) are both generated and verified using the same secret key. This implies that the sender and the receiver of a message must agree on the same key before initiating communications, as is the case with symmetric encryption. In contrast, a digital signature is generated using the private key of a key pair, which is public-key cryptography.

In cryptography, a MAC, sometimes known as a tag, is a short piece of information used to authenticate a message— in other words, to confirm that the message came from the stated sender (its authenticity) and has not been changed. The MAC value protects both a message's data integrity as well as its authenticity, by allowing verifiers (i.e., a receiver who also possess the secret key) to detect any changes to the message content.

An HMAC, sometimes expanded as either keyed-hash message authentication code or hash-based message authentication code, is a specific type of MAC involving a cryptographic hash function and a secret cryptographic key. It may be used to simultaneously verify both the data integrity and the authentication of a message, as with any MAC. The cryptographic strength of the HMAC depends upon the cryptographic strength of the underlying hash function, the size of its hash output, and the size and quality of the key. HMAC does not encrypt the message. Instead, the message (encrypted or not) must be sent alongside the HMAC value (i.e., the HMAC hash). Parties with the secret key will hash the message again themselves, and if it is authentic, the received and computed hashes will match.

A cryptographic hash function is a special class of hash function that has certain properties which make it suitable for use in cryptography. It is a mathematical algorithm that maps data of arbitrary size to a bit string of a fixed size (a hash) and is designed to be a one-way function, that is, a function which is infeasible to invert. A hash is a string or number generated from a string of text. The resulting string or number is a fixed length, and will vary widely with small variations in input. No two pieces of data can produce the same output. Thus, each piece of data results in a unique hash (e.g., a MAC hash or an HMAC hash).

Specifically, hashing is mapping data of any length to a fixed-length output using an algorithm. Typically, the hashing algorithm commonly used is SHA-1, SHA-2 and SHA-3, but embodiments described herein are not limited thereto. Hashing may be used in any instance where a value is being compared with a stored value, but cannot store its plain representation for security reasons.

For example, when a user sends a secure message, a hash of the intended message is generated and encrypted, and is sent along with the message. When the message is received, the receiver decrypts the hash as well as the message. Then, the receiver creates another hash from the decrypted message. If the two hashes are identical when compared, then a secure transmission has occurred. Both the transmitter and the receiver must use the same hash function or algorithm. In some cases, the transmitter may send the receiver the algorithm along with the hash value of the message. This hashing process ensures that the message is not altered by an unauthorized end user. Thus, the purpose of hashing is to verify the integrity of the transmitted message, but it may also be used for authentication if a key is used, as is the case of HMACs.

It will be appreciated that a checksum value, a hash value, a MAC value, a HMAC value, and derivations thereof may be used interchangeably throughout this disclosure and may generally be referred to as an authentication tag without deviating from the described embodiments. A symmetric secret key may be used at the sender and the receiver along with the data message to generate an authentication tag, such as a MAC.

An encrypted plaintext message may be referred to a ciphertext. Ciphertext is the result of encryption performed on plaintext using an algorithm, called a cipher. Ciphertext is also known as encrypted or encoded information because it contains a form of the original plaintext that is unreadable by a human or computer without the proper cipher to decrypt it. Decryption, the inverse of encryption, is the process of turning ciphertext into readable plaintext. As noted above, a message may be transmitted encrypted (e.g., as ciphertext) or unencrypted, along with its hash value.

According to one or more embodiments, hardware is deployed to support cryptographic functions to authenticate and/or encrypt data for ECUs that have (hard) real-time, low-latency, high-throughput constraints that often appear in the automotive networks for in-vehicle communication using a communication network and for data storage (e.g., external flash memory).

Cryptography enables confidentiality, authenticity, and data integrity and will become more prominent in the automotive semiconductor sector, where functional safety, real-time constraints, and energy consumption play an important role. Thus, one or more embodiments provided herein utilize selective real-time cryptography to employ a selective tradeoff between data throughput and data authentication and security (e.g., triggered by safety signals), and to employ safety mechanisms.

There may be different types of data exchanged in a device network and/or data that have different contexts. Some data may relate to safety-related functions. For example, in a vehicle network, certain functions, such as antilock braking, LIDAR, and radar, may be required to comply with one or more safety protocols or standards. On the other hand, audio stream data may not relate to a safety-related function. Thus, verifying the integrity of data related to safety-related functions may be of more importance than verifying the integrity of data related to non-safety-related functions.

As a result, there may be a selective tradeoff between data throughput and data security, where use of a MAC to verify the integrity of data may decrease data throughput but increase data authentication, and thus safety. Further steps may also be implemented to increase data security, again at the cost of lower data throughput.

In addition, certain data types may require different levels of bandwidth. For example, antilocking break system data may require a relatively low data rate and thus a low bandwidth, but have a real-time requirement. Whereas, image data reconstructed from radar data or LIDAR data may be relatively bulky and require great deal of bandwidth. Despite the vast amount of data in an image, there may be only certain image regions or frequencies that are of interest depending on the use case. Furthermore, audio data may include frequency regions that are outside the range of human hearing. Thus, data pre-filtering may be used to reduce the amount of data transmitted in a communication network according to the data type and data context.

FIG. 1 shows a block diagram of a communication system 100 according to one or more embodiments. The communication system 100 includes a sender 1 and a receiver 2 that are provided in and communicate via a communication network 3. The communication network 3 may be, for example, a vehicle communication network in a vehicle or an Internet of Things (IoT) network (not illustrated). The IoT is a network of physical devices, vehicles, home appliances, and other items embedded with electronics, software, sensors, actuators, and connectivity which enables these things to connect, collect, and exchange data. In addition, the communication network 3 may be a restricted private network in which predetermined data types, referred to as traffic classes, are present. Thus, the restricted private network may be configured with a predefined set of rules and traffic classes which are cross-referenced in a lookup table.

Both the sender 1 and the receiver 2 may be an ECU, an MCU, and/or a hardware security module integrated within a vehicle. Alternatively, the sender 1 may be a sensor that is part of a system or a communication network and the receiver 2 may be configured to receive sensor data from the sensor and verify the integrity of the sensor data based on a verification scheme described herein. For example, a sensor may be a sensor incorporated in an IoT network in a vehicle, a home appliance, or other item where the sensor authenticates its transmit data.

In addition, each network device may be configured as both a sender and a receiver. Thus, the sender 1 and the receiver 2 may be integrated in a single ECU, sensor, or other network device.

The sender 1 includes pre-stage data processor 10, a data classifier 11, a security processor 12, a Pseudo Random Number Generator (PRNG) 13, a synchronization controller 14, and a transceiver 16. In addition, the security processor 12 includes a parsing processor 17, a secret key selection unit 18, and a tag generator 19. Thus, as will be described in more detail, the sender 1 includes one or more processors configured to process data and transmit data messages over the communication network 3.

A used herein, a data message includes vehicle data that may be arranged in a data block or a data stream. Vehicle data is data that is, for example, generated while a vehicle is in operation and/or in motion. This may include radar data generated by a vehicle radar sensor, LIDAR data generated by a vehicle LIDAR sensor, camera data generated by a vehicle camera sensor or image sensor, vehicle control data, vehicle assistance-system data, autonomous driving data, vehicle display data, vehicle-to-vehicle communication data, sensor data generated in an autonomous driving vehicle or in an augmented safety system of a vehicle.

The data message may include a header and a payload (i.e., the vehicle data). The header may include a source identifier (ID) from which the data originates (e.g., from a LIDAR sensor) and/or context information pertaining to the payload (e.g., data type). For example, the data type may indicated whether the data includes video data, audio data, image data, sensor data, and the type of sensor data. Thus, a vehicle component responsible for generating the data and the type of data can be determined from the header. In some example, the header may include a traffic class identifier (TCI) that identifies the traffic class to which the data message corresponds.

In addition, while a tag generator is used in the described examples to generate a MAC value, it will be appreciate that a tag generator may also be used to generate other types of authentication tags, such as checksum values or other hash values.

The receiver 2 includes a security processor 22, a PRNG 23, a synchronization controller 24, a comparison unit 25, and a transceiver 26. In addition, the security processor 22 includes a parsing processor 27, a secret key selection unit 28, and tag generator 29. The comparison unit 2525 generates a validation signal (i.e., a validation result) based on a verification process. Thus, as will be described in more detail, the receiver 2 receives data messages over the communication network 3 and includes one or more processors configured to process the data messages and verify an integrity and/or authenticity thereof.

Each transceiver 16 and 26 may include at least one processor or controller configured to perform additional functions, such as handshaking, multiplexing, and sorting. In addition, it will be appreciated that each transceiver 16 and 26 may include separate receivers and transmitters as opposed to using a single transceiver unit.

The data classifier 11 of the sender 1 includes at least one processor configured to receive data, analyze the received data or the metadata in its header to determine its traffic class, and select a processing rule from among a set of processing rules based on the determined traffic class (i.e., based on a determined TCI).

For example, the data classifier 11 may include a lookup table stored in memory in which a predefined message catalog is provided. The predefined message catalog is made up a plurality of traffic classes. Each traffic class in the lookup table is linked to a corresponding processing rule which indicates whether or not data pre-filtering is performed on the data, and whether or not data authentication is to be used during the transmission of the data. With respect to the latter, if data authentication is to be used, the processing rule may also indicate a level of the data authentication to be used. For example, the level of authentication may mean that the security processor 12 may be is directed to generate an authentication tag, such as a MAC, for every data message for that particular data type. This would indicate the highest level of authentication. In another example, for a lower level of authentication, the security processor 12 may be directed to generate an authentication tag for data messages out of a group of two data messages, where which one the two data messages may be randomly selected. In another example, for yet a lower level of authentication, the security processor 12 may be directed to generate an authentication tag for data messages out of a group of five data messages, where which one the five data messages may be randomly selected, and so on.

Upon determining the traffic class of the data, the data classifier 11 may transmit the TCI via an output terminal Out1 to the transceiver 16 to be included in the header of the data message. In addition, if the data classifier 11 determines from the selected processing rule set that no further data processing to be performed and that no data authentication is needed, the data classifier 11 may also transmit the data via output terminal Out1 to the transceiver 16, and the transceiver 16 may transmit the data message, including the TCI and the data, to the receiver 2 without an authentication tag (e.g., without a MAC).

On the other hand, the data classifier 11 may determine that from the selected processing rule that pre-filtering is to be performed but that data authentication is not to be performed. In this case, the data classifier includes a pre-filtering data processor configured to perform pre-filtering on the data. The pre-filtered data may then be output to the transceiver 16 via output terminal Out1.

The pre-filtering performed the pre-filtering data processor is optional but may be used to increase the data throughput in the communication system 100. The pre-filtering data processor includes at least one processor configured to filter out unwanted components of the data, while passing along the desired data components to the transceiver and/or the security processor 12. The pre-filtering may be based on a source of the data (e.g., based on a source ID) and/or the determined traffic class. For example, an imaging source, such as a radar sensor, LIDAR sensor, or camera sensor may be identified and a high pass filtering operation may be performed to allow a high frequency portion corresponding to sharp edges of an image to be output. In another example, an audio source may be identified such that a high frequency portion outside an audible range of a human ear can be filtered out, where the audible portion of the data is output.

On the other hand, the data classifier 11 may determine that from the selected processing rule that authentication is to be performed and that pre-filtering is to be performed or is not to be performed. In this case the data or pre-filtered data is output to both the transceiver 16 and the security processor 12 via output terminal Out2. In other words, if the selected processing rule indicates that pre-filtering is to be performed, the pre-filtering data processor first applies pre-filtering to the data prior to outputting the data at output terminal Out2. In contrast, the selected processing rule indicates that pre-filtering is not to be performed, the original data is forward to the output terminal Out2 without pre-filtering being performed thereon.

Here, the data classifier 11 may include one or more multiplexers used for forwarding the data to the appropriate output terminal and/or data processor (e.g., to the pre-filtering data processor).

The data may be generated by the sender 1 or received from an external device, such as a sensor. The security processor 12 is configured to receive the data or pre-filtered data (collectively referred to as "data"), parse the data by extracting a subset of bits or bytes from the data, and generate a MAC using the extracted data subset and a secret key. As used herein, a bit or a byte may generally be referred to as a "segment of data." Segments of data are extracted from the data forming a data subset. The data subset is used to generate an authentication tag, such as a MAC.

The parsing processor 17 is configured to extract a subset of bits or bytes from the data (i.e., original data or pre-filtered data) based on a randomized intra-message pattern. That is, the randomized intra-message pattern determines which bits or bytes from the data are to be used by the tag generator 18 to generate a checksum value or hash value. In this example, a MAC value is generated using the extracted data subset instead of the entire data message and a selected secret key. Generating the MAC value based on only a subset of the original data may help increase the data throughput of the communication system 100.

A intra-message pattern of bits or bytes of a data message to be used in the MAC value may include every $N^{th}$ bit/byte, where N is any integer, every even bit/byte, every odd bit/byte, or any random sequence of bits/bytes. The intra-message pattern of bits/bytes is randomized based on the output of a PRNG.

The amount of data to be extracted is selectable based on a desired data throughput. Thus, it is possible that a smaller or a larger portion, including an entire portion, of the data message will be selected for use by the tag generator 19 to generate the MAC value. For example, when security is of greater concern, a larger portion or even an entire portion of the data message may be selected by the parsing processor 17 defined by the selected processing rule and passed along to the tag generator. In this case, data throughput may decrease as a tradeoff for more secure communications between the sender 1 and the receiver 2. On the other hand, when security is of lesser concern, a smaller portion of the data message may be selected by the parsing processor 17, defined by the selected processing rule, and passed along to the tag generator 19. In this case, data throughput may increase while security may decrease.

The tag generator 19 may also receive a secret key from a secret key selection unit 18 to be used for generating the MAC. In particular, the secret key selection unit 18 may store one or more symmetric secret keys, the secret keys being synchronized with the receiver 2. In the case that two or more secret keys are stored, the secret key selection unit 18 may be configured to receive the output of a PRNG, and select a secret key from the stored secret keys to be provided to the tag generator 19. By doing so, the selection of the secret key may be randomized, which further improves the security of the data communication in the network. Of course, it is also possible that only a single secret key is stored at a time and that this key is provide to the tag generator 19 without random key selection being performed.

The synchronization controller 14 and the PRNG 13 may, together, be referred to as a random sequence generator. Similarly, the synchronization controller 24 and the PRNG 23 may, together, be referred to as a random sequence generator and may be identical in configuration to the synchronization controller 14 and the PRNG 13, respectively. The PRNGs 13 and 23 are identical and synchronized with each other. For example, the sender 1 and the receiver 2 may exchange a seed value for the PRNGs 12 and 23, preferably in a secured manner to prevent misuse by attackers. This synchronization of seed values may performed in a handshake operation before full communication begins between the sender 1 and the receiver 2. The handshake operation may also include the exchange of one or more secret keys, the exchanged secret keys being stored in secret key selection units 18 and 28.

The synchronization controller 14 may include a True Random Number Generator (TRNG) that is configured to generate a random number (e.g., a 32 bit seed value) that is used to initialize the PRNG 13. The PRNG 13 receives the seed value (i.e., the random number) from the TRNG (e.g., a 32 bit value), and the PRNG 13 produces a sequence of random bits (i.e., a random bit sequence) and outputs the sequence of random bits as a randomization signal.

The synchronization controller 14 may include a controller that controls the length of the random bit sequence generated by the PRNG 13. For example, the controller may provide a configuration signal to the PRNG 13 to set the parameters, including the length of the random bit sequence, of the PRNG 13. A shorter random bit sequence results is a lower number of bits or bytes being extracted from the data by the parsing processor 17. Conversely, a longer random bit sequence results in a higher number of bits or bytes being extracted from the data by the parsing processor 17. The length of the random bit sequence may be changed each time the vehicle is turned on and may remain fixed for a single driving cycle or, alternatively, may be changed after a predetermined number or a random number of driving cycles.

The synchronization controller 14 is configured to synchronize a seed value with the synchronization controller 24 of the receiver 2 and come to an agreement therewith for a single seed value that is used to initialize both the PRNG 13 and the PRGN 23. This, exchange of a seed value may occur in a secured manner (e.g., via encrypted communication) between the transceivers 16 and 26. Since the PRNG 13 and the PRGN 23 are identical, they will both generate the same random bit sequence when the seed value is the same. The random sequence of bits identifies the bits or bytes (i.e., the data segments) to be extracted from the data message.

Parsing processors 17 and 27 each receive a randomization signal with the random bit sequence from their respective PRNGs 13 and 23, with the random bit sequences being identical. The random bit sequence represents a random intra-message pattern of bits that are used by the parsing processors 17 and 27 to determine which bits or bytes to extract from the data to forward to the tag generators 19 and 29. For example, each bit in the random bit sequence corresponds to a bit or byte in the data analyzed by the parsing processor. A logic 1 in the random bit sequence may indicate that the corresponding bit or byte from the data is extracted and include in the subset of data sent to the tag generator 19, whereas a logic 0 in the random bit sequence may indicate that the corresponding bit or byte from the data is not sent to the tag generator 19 for generating the MAC value. Of course, the roles of a logic 1 and a logic 0 may be reversed as well.

Thus, a randomized data subset is selected from the data message by the parsing processors 17 and 27 according to a random pattern of the random bit sequence. In the event that the random bit sequence changes, a new intra-message pattern of random bits or bytes would be selected from the data message by the parsing processors 17 and 27. The process of selecting a randomized data subset from a data message is referred to as an intra-message verification scheme. As noted above, the number of extracted bits or bytes may also change according to the length of the random bit sequence.

Similarly, secret key selection units 18 and 28 each receive the randomization signal with the random bit sequence from their respective PRNGs 13 and 23, with the random bit sequences being identical. The secret key selection units 18 and 28 select a secret key based on the random bit sequences. Since the random bit sequences are identical, the selection of the secret key is identical. In other words, both secret key selection units 18 and 28 select the same secret key to be used for generating a MAC. Thus, both secret key selection units 18 and 28 include a memory for storing one or more secret keys and a processor for selecting the secret key based on the received random bit sequence.

Upon receiving the randomized data subset from the parsing processor 17 or 27 and a secret key from the secret key selection unit 18 or 28, each tag generator 19 and 29, respectively, generates a MAC unique to the randomized data subset by applying a checksum function or hash function to the randomized data subset, and the security processor 12 and 22 output their respective MACs. For example, security processor 12 may output a MAC to transceiver 16 11 and security processor 22 may output a MAC (i.e., a recalculated MAC) to the comparison unit 25.

Figure 2:
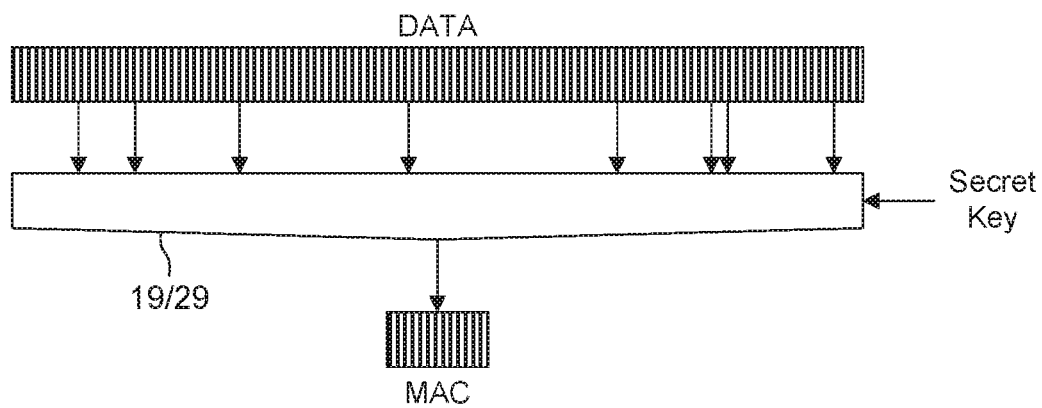
FIG. 2 shows a block diagram illustrating an example of generating a MAC based on an intra-message verification scheme according to one or more embodiments.

FIG. 2 shows a block diagram illustrating an example of generating a MAC based on an intra-message verification scheme according to one or more embodiments. Each tag generator 19, 29 is configured to receive selecting data segments (i.e., bits or bytes) that are extracted from the data message, as indicated by the corresponding arrows, based on a random pattern of bits generated by a PRNG. Each tag generator 19, 29 is then configured to generate and output a MAC using the selected data segments. The number of data segments to be used in generating each MAC is selectable according to a desired data rate throughput and security level. For example, selecting a smaller number of segments may permit higher data rate throughput, but may result in lower a level of security. In contrast, selecting a larger number of segments may result in a higher level of security, but may result in a lower data rate throughput. Regardless of the number of selected segments, both security processors 12 and 22 are configured to select the same number of data segments during a communication operation.

Once the tag generator 19 generates the MAC, the sender 1 can start preparing the transmission of the data message via the transceiver 16. That data message includes a header in which the TCI provided by the data classifier 11 is included. If pre-filtering was used on the original data message, the pre-filtered data message may transmitted to the receiver 2 instead of the original data message. The transceiver 16 may optionally include an encryption processor configured to receive the data message, comprising either original data or pre-filtered data, and encrypt it. The encryption processor may also encrypt the MAC. Thus, in one example, a MAC is produced based on the data message (i.e., the plaintext), and the data message and the MAC are transmitted, unencrypted, to the receiver 2 via the communication network 3.

In another example, a MAC is produced based on the data message (i.e., the plaintext), and the data message is encrypted to produce a ciphertext without the MAC. The data message's MAC and the ciphertext are then sent together to the receiver 2 over the communication network 3.

According to another example, a MAC is produced based on the data message (i.e., the plaintext), and then the data message and the MAC are together encrypted to produce a ciphertext based on both the data message and the MAC. The ciphertext (containing an encrypted MAC) is transmitted as ciphertext (containing an encrypted MAC) via the communication network 3 to the receiver 2.

The transceiver 16 may also indicate the algorithm used to generate the MAC (i.e., either the checksum function or hash function) so that the receiver 2 can apply the same algorithm when verifying the authenticity of the data message. This may be negotiated, for example, during the connection establishment (e.g., via a handshake operation) between the sender 1 and the receiver 2. In addition or in the alternative, the algorithm may be determined by a mapping to the traffic class identifier (TCI). That is, both data classifiers 11 and 21 may be configured transmit the TCI of a corresponding data message to the tag generators 19 and 29, respectively. Each tag generator 19 and 29 may access a look-up table stored in memory that maps each TCI to an algorithm. Thus, tag generator 19 and 29 may determine which algorithm to apply for generating the MAC based on the received TCI via its look-up table. In this way, different algorithms may be applied based on different traffic classes. The transceiver 26 of the receiver receives the data message or pre-filtered data message and the MAC, and starts a verification process to verify the integrity of the data message/pre-filtered data message (hereinafter generally referred to as a data message). In particular, the transceiver 26 includes a data classifier 21 which analyzes the header of the data message to determine its corresponding traffic class. Specifically, the data classifier 21 may extract the TCI provided in the header of the data message for determining the traffic class. In addition, the data classifier 21 includes a lookup table and a set of processing rules identical to the lookup table and the set of processing rules stored in data classifier 11. Thus, the data classifier 21 may be configured to determine the traffic class of the data message by extracting the TCI and selecting a processing rule from a set of processing rules by using the TCI and referring to the lookup table.

Upon determining the processing rule to apply to a received data message, the data classifier 21 may forward the data to the tag generator 29 (e.g., if a MAC is to be generated based on the processing rule) and/or to the data processor 30 (e.g., if not authentication is to be performed for the received data based on the processing rule). The data processor 30 may be configured to perform additional data processing on the received data. If authentication is required by the processing rule, the data processor 30 may wait for the results indicated in the validation signal prior to processing the data. It will also be appreciated that the data processor 30 may be provided external to the receiver 2 but within the communication network.

In addition, the transceiver 26 receives the transmitted MAC, verifies the MAC, including identifying the checksum function or the hash function that was used to create the MAC, and optionally decrypts the MAC if the MAC was encrypted by the sender 1. Once the data classifier 21 determines the processing rule from the traffic class, it may also provide the received MAC to the comparison unit 25 for verification. The data classifier 21 may also initiate an authentication process by providing the data to the security processor 22 (i.e., to the parsing processor 27).

The security processor unit 22 receives the data message from the transceiver 26, and generates a MAC from the data message based on a similar procedure applied by the security processor 12. That is, the parsing processor 27 receives the data message and the random sequence of bits from the PRNG 23, and selects data segments from the data message that corresponds to the pattern of the random sequence of bits. The random sequence of bits is identical to the random sequence of bits used by parsing processor 17 due to the synchronization of seed values. In the event that the data message was encrypted by the sender 1, the data message may be decrypted at the transceiver 26 prior to providing the data message to the security processor 22.

In addition, the secret key selection unit 28 selects a secret key based on the random sequence of bits from the PRNG 23 and provides the selected secret key to the tag generator 29 to be used for generating a recalculated MAC.

The tag generator 29 is configured to generate a MAC (i.e., a recalculated MAC) using the function provided by the transceiver 26, the secret key provided by the secret key selection unit 28, and the selected data segments provided by the parsing processor 27. In other words, the tag generator 29 recalculates the MAC anew using the same secret key used by tag generator 19 so that this MAC value can be compared with the MAC that was received by the transceiver 26. The recalculated MAC is then output from the security processor 22 to the comparison unit 25 where it is compared with the MAC provided by the transceiver 26.

The comparison unit 25 is a processor or a comparator circuit configured to compare the two MAC values, and generate a validation signal based on the comparison result. For example, the validation signal may indicate whether the two MAC value are matched or mismatched, where a mismatch indicates an error in the received data message. For example, if these two MAC values are not identical, then the data message has subsequently been modified in some way and the authentication process fails. If any such anomaly occurs, then the verification system alerts the recipient concerning the nature of the failure via the validation signal (i.e., fault signal), indicating that the resulting data message is suspect and should not be trusted. However, if the MAC values are identical, then the data message is authenticated and the data processor 30 may proceed with processing the received data. Thus, the receiver 2 is configured to verify the received data message.

In view of the above, a pre-defined pattern/rules can be applied in the real-time context. Here, signals inside a data frame, especially for CAN and ETH messages, can be treated differently. For example, safety-related messages may be always checked and verified by the receiver 2, whereas real-time messages may not be checked and verified by the receiver 2 only some of the time or not at all. In other words, the sender 1 and receiver 2 may be configured to use the above-described verification and authentication processes in the context of safety-related data messages, and may communicate without the verification and authentication processes for real-time data messages.

Here, safety-related data messages may represent one group of traffic classes where different data types may be defined therein, and real-time data messages may represent another group of traffic classes where different data types may be defined therein. Each traffic class group may also include one or more traffic classes specific to a data type and a processing rule. In one example, a subset of the bits of the TCI (e.g., most-significant bits) may classify a message as safety-critical and therefore it has to be signed/verified by the system.

On a system level, the intra-message pattern is fixed for one or more driving cycles and randomly chosen for each of the ECUs in a vehicle communication network. For example, a new seed value may be generated by the TRNG of the synchronization controller 14 or 24 and synchronized between a sender 1 and a receiver 2 each time a vehicle is turned on (i.e., each time the ECUs are powered on). The new seed value is provided to the PRNGs 13 and 23, resulting in a new random sequence of bits generated by the PRNGs 13 and 23. This in turn, produces a new random intra-message pattern used for selecting data from a data message that is used to generate the MAC values. A driving cycle is a period from a time the vehicle is turned on (e.g., when the engine is turned on) to a time the vehicle is turned off (e.g., when the engine is turned off). Thus, a new driving cycle is started each time the vehicle is turned on. A new intra-message pattern may be set at the start of each driving cycle of after a predetermined number of driving cycles.

The communication system 100 may also be configured to apply a inter-message verification scheme or a verification scheme that uses a combination of intra-message and inter-message verification schemes (i.e., a hybrid intra-message and inter-message verification scheme). The inter-message scheme pertains to using a random pattern to determine which data messages (i.e., data blocks or data streams) out of a plurality of data messages will be verified and which data messages will not be verified. The sender 1 and receiver 2 may use a handshaking operation prior to full communication to agree upon which verification scheme or schemes are to be used for the full communication. Alternatively, different verification schemes may be mapped to different traffic classes (i.e., different TCIs), and the data classifiers 11 and 21 can determine which verification scheme (e.g., different cryptographic algorithm) to use based on the traffic class of the data message via a lookup table.

In the intra-message verification scheme, the sender 1 is configured to transmit a plurality of data messages each with a corresponding MAC value. Here, each data message may be an original data message or a pre-filtered data message, as similarly described above. In addition, each MAC value may be generated based on the full data message or based on the intra-message selection technique described above during which a randomized data subset is selected from the data message and used to generate each MAC value. Thus, certain elements may be activated depending on whether the intra-message selection technique is triggered by the data classifiers 11 and 21. For example, if the intra-message or the hybrid technique is selected, the data may be input to the parsing processors 17 and 27. However, if inter-message technique is selected, the data may be input directly to the tag generators 19 and 29 without parsing.

In the inter-message verification scheme, sender 1 (and receiver 2) can be configured using different secret keys for the MAC calculation (resp. verification). If the TCI-based classification is hierarchical (e.g., the most significant bit indicates if authentication/verification is required or not). This scheme reduces the processing time and therefore latency.

In addition, each MAC on the sender side under the inter-message scheme may be generated by tag generator 19 using the same secret key or by using different secret keys. Likewise, each MAC on the receiver side under the inter-message scheme may be generated by tag generator 29 using the same secret key or by using different secret keys, which are synchronized with the sender side. That is, a different secret key may be assigned to each subsequent data message, and a corresponding MAC may be generated using the different secret key. In this case, the sender 1 and receiver 2 also must be in agreement with which secret key is used for each data transmission so that the same secret key is used for generating and verifying the same MAC. Thus, tag generator 29 at the receiver 2 uses the same secret key or keys for generating MACs for different data messages as used by tag generator 19 based on the sequence of data transmission.

The transceiver 26 of receiver 2 may further include a Random Number Generator (RNG) 33 and the data classifier 21 may include another parsing processor configured to sort out which data messages are to be verified and which are not. In essence, the data classifier 21 may determine that inter-message verification is to be used based on the TCI of the data message, and use the RNG 33 and the parsing processor 34 to determine which MACs will be verified and which will not be verified according to a random inter-message pattern.

In particular, the RNG 33 is configured to generate a random sequence of bits corresponding to the random inter-message pattern used by the parsing processor 34. In particular, the random sequence of bits indicates a verification sequence applied to the plurality of data messages/MACs, where each bit of the random sequence of bits corresponds to one of the plurality of messages. A logic 1 in the random bit sequence may indicate that the corresponding data message and MAC is selected for verification such that the data message is sent to the security processor 22 and the MAC is sent to the comparison unit 25. In contrast, a logic 0 in the random bit sequence may indicate that the corresponding data message and MAC is not selected for verification and is not sent to the security processor 22 or the comparison processor 25. Instead, the data message not to be verified may be sent to the data processor 30, while its MAC may be discarded. Of course, the roles of a logic 1 and a logic 0 may be reversed as well.

The synchronization controller 24 may include a controller that controls the length of the random bit sequence generated by the RNG 33. For example, the controller may provide a configuration signal to the RNG 33 to set the parameters, including the length of the random bit sequence, of the RNG 33. A shorter random bit sequence results is a lower number data messages being selected by the parsing processor 34 for verification. Conversely, a longer random bit sequence results is a higher number of data messages being selected by the parsing processor 34 for verification. The length of the random bit sequence may be changed each time the vehicle is turned on and may remain fixed for a single driving cycle or, alternatively, may be changed after a predetermined number or a random number of driving cycles.

The RNG 33 may be configured to receive a request for a random bit sequence from the data classifier 21 in response to the data classifier 21 determining that inter-message verification is to be used based on its analysis of the data message's traffic class. The RNG 33 may then transmit the random bit sequence to the parsing processor 34 in response to the received request.

The parsing processor 34 is configured to receive the random bit sequence from the RNG 33 as well as the data messages and corresponding MACs, and select which data messages/MACs are to be verified according to the pattern of the random bit sequence. Those data messages selected by the parsing processor 34 are forwarded along to the security processor 22 and the corresponding MACs selected by the parsing processor 34 are forwarded along to the comparison unit 25.

If only the inter-message verification scheme is being employed, the selected data messages are received by the tag generator 29, from which a MAC value is recalculated and then compared by the comparison unit 25 to the MAC value that is decrypted by the MAC processor 25. On the other hand, if both the inter-message verification scheme and the intra-message verification scheme are being employed, the selected data messages are received by the parsing unit 27, which applies the intra-message selection technique to each data message, as described above, prior to sending a data subset of each data message to the tag generator 29.

Figure 3:
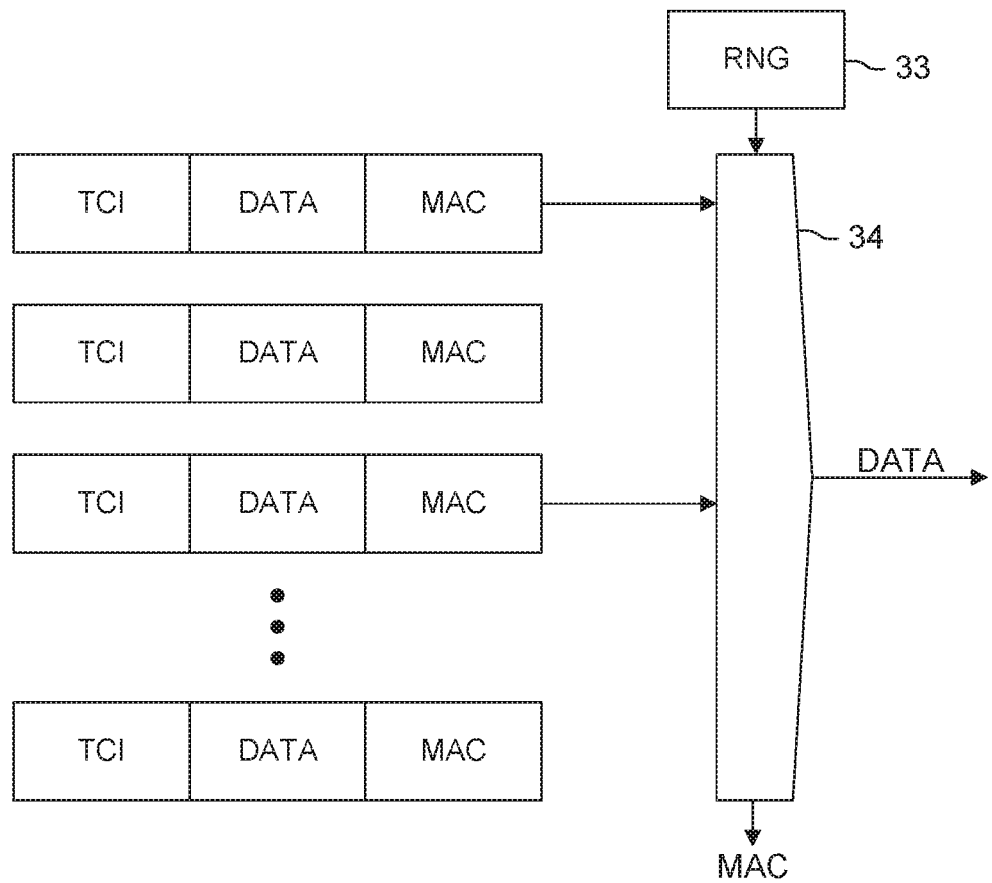
FIG. 3 shows a block diagram illustrating an example of selecting data messages and MACs for verification based on a inter-message verification scheme used at a receiver according to one or more embodiments.

FIG. 3 shows a block diagram illustrating an example of selecting data messages and MACs for verification based on an intra-message verification scheme used at a receiver according to one or more embodiments. In particular, the parsing processor 34 is configured to receive the random bit sequence from the RNG 33 as well as the data messages and corresponding MACs, and select which data messages/MACs are to be verified according to the pattern of the random bit sequence. Those data messages selected by the parsing processor 34 are forwarded along to the security processor 22 and the corresponding MACs selected by the parsing processor 34 are forwarded along to the MAC processor 25. In this example, the first and third data messages/MACs are selected by the parsing processor 34 for verification, whereas the second and last data messages/MAC are not selected.

In view of the above, a pre-defined pattern/rules can be applied in the automotive real-time context. Here, signals inside a data frame, especially for CAN and ETH messages, can be treated differently. For example, safety-related messages may be always checked and verified by the receiver 2, whereas real-time messages may not be checked and verified by the receiver 2 only some of the time or not at all. In other words, the sender 1 and receiver 2 may be configured to use the above-described verification and authentication processes in the context of safety-related data messages, and may communicate without the verification and authentication processes for real-time data messages.

On a system level, the inter-message pattern is fixed for one or more driving cycles and randomly chosen for each of the ECUs in a vehicle communication network. For example, a new random sequence of bits may be generated by RNG 33 each time a vehicle is turned on (i.e., each time the ECUs are powered on). For example, a new seed value may be generated by a TRNG. This in turn, produces a new random inter-message pattern used for selecting data messages and MACs for verification. A driving cycle is a period from a time the vehicle is turned on (e.g., when the engine is turned on) to a time the vehicle is turned off (e.g., when the engine is turned off). Thus, a new driving cycle is started each time the vehicle is turned on. A new inter-message pattern may be set at the start of each driving cycle of after a predetermined number of driving cycles.

Figure 4:
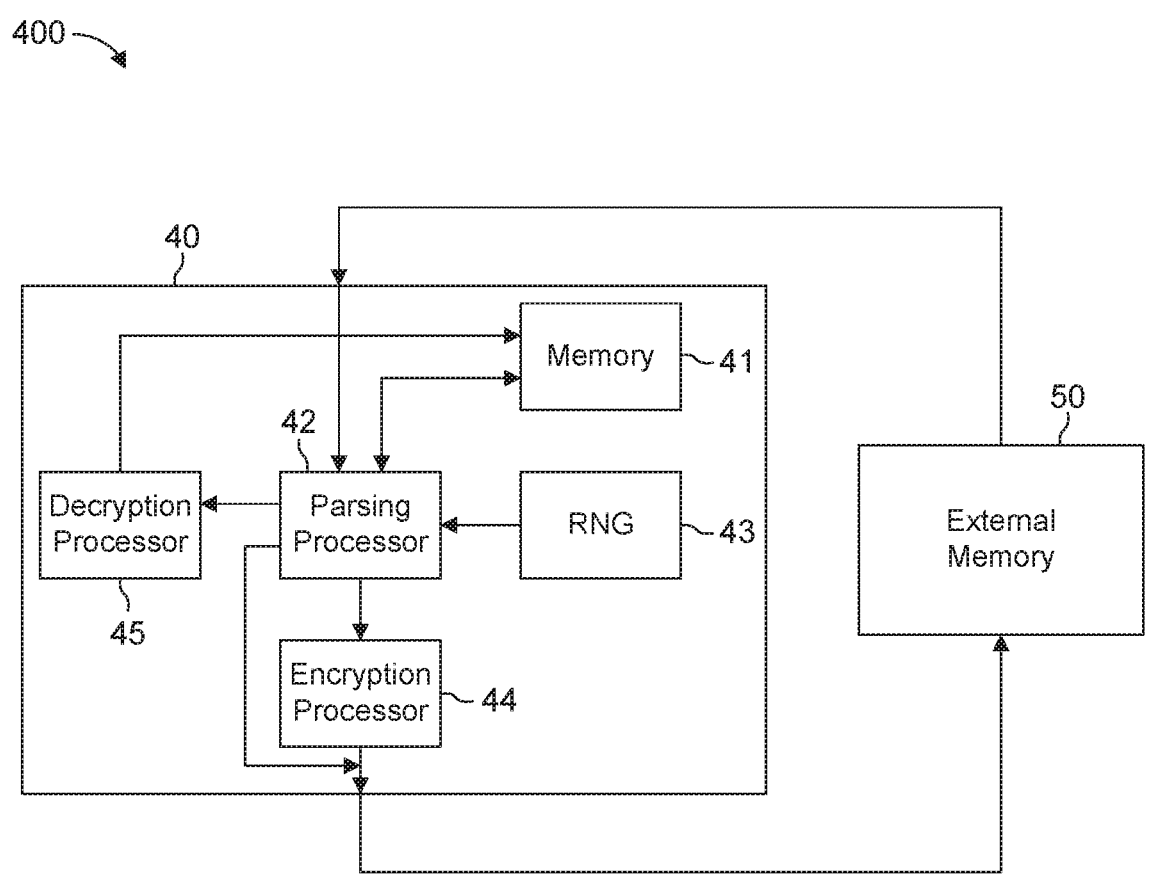
FIG. 4 shows a block diagram of a storage system according to one or more embodiments.

FIG. 4 shows a block diagram of a storage system 400 according to one or more embodiments. The storage system 400 includes an ECU 40 and an external memory device 50 that communicate via a vehicle communication network. The external memory device 50 may be a flash memory device configured to store a data block from the ECU 40. The data block may be plaintext data.

The ECU 40 includes an internal memory device 41, a parsing processor 42, an RNG 43, an encryption processor 44, and a decryption processor 45. The parsing processor 42 and the RNG 43 may be used in combination to randomly select which data blocks from a plurality of data blocks to encrypt and which not to encrypt. For example, the RNG 43 may generate a random sequence of bits that define a random pattern. Each bit in the random sequence of bits may correspond to a data block to be sent to the external memory device 50, and the parsing processor 42 may identify which data blocks are to be encrypted and which are not to be encrypted based on the random sequence of bits. Those data blocks selected for encryption are sent to the encryption processor 44, which is configured to encrypt the data block, for example, into ciphertext. Those data blocks not selected for encryption bypass the encryption processor and are provided to an output of the ECU 40 for transmission to the external memory device 50. The external memory device 50 is configured to store by encrypted and unencrypted data blocks.

Upon retrieval of the data blocks stored in the external memory device 50, the ECU 40 is configured to determine which data blocks are to be decrypted based on the same random sequence of bits that was used to select data blocks for encryption. Thus, the data blocks are received by the parsing processor 42 upon retrieval from the external memory device 50, and the parsing processor 42 selects which data blocks are to be sent to the decryption processor 45 and which are to be sent directly to the internal memory device 41 based on the random sequence of bits. The decryption processor 45 is configured to decrypt the encrypted data blocks, and send the decrypted data blocks to the internal memory device 41.

Figure 5:
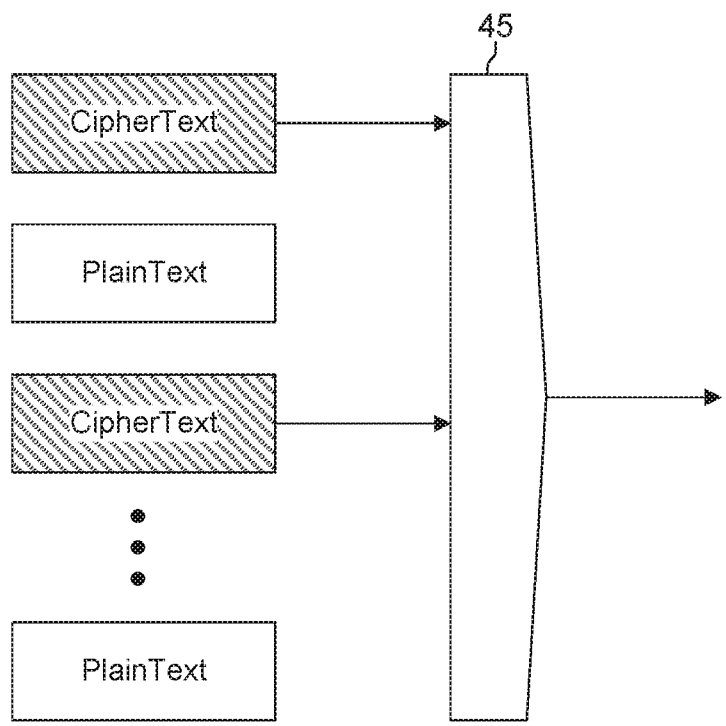
FIG. 5 shows a block diagram illustrating an example for decrypting a random set of data blocks according to one or more embodiments.

FIG. 5 shows a block diagram illustrating an example for decrypting a random set of data blocks according to one or more embodiments. In particular, a decryption processor 45 is configured to receive ciphertext provided from a parsing processor, decrypt the ciphertext, and output the plaintext. The ciphertext may be selectively provided by the parsing processor based on a random sequence of bits, as described above in conjunction with FIG. 4.

On a system level, the inter-block selection pattern is fixed for one or more driving cycles and randomly chosen for each of the ECUs in a vehicle communication network. For example, a new random sequence of bits may be generated by RNG 43 each time a vehicle is turned on (i.e., each time the ECUs are powered on). For example, a new seed value may be generated by a TRNG. This in turn, produces a new random inter-block selection pattern used for selecting data blocks for encryption and decryption. A driving cycle is a period from a time the vehicle is turned on (e.g., when the engine is turned on) to a time the vehicle is turned off (e.g., when the engine is turned off). Thus, a new driving cycle is started each time the vehicle is turned on. A new inter-block selection pattern may be set at the start of each driving cycle of after a predetermined number of driving cycles.

Although embodiments described herein relate to vehicle systems and vehicle communication networks, it is to be understood that the concepts described herein may similarly be extended to internet-of-things (IoT) systems, industrial control systems, smart home systems, including home appliances, and the like in which the sender 1 and the receiver 2 are incorporated into said systems to transmit/receive data messages and MACs over a corresponding communication network and use the verification schemes disclosed herein.

In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

Depending on certain implementation requirements, embodiments provided herein can be implemented in hardware and/or in software. The implementation can be performed using a computer readable, digital storage medium, for example a DVD, a Blue-Ray, a CD, a RAM, a ROM, a PROM, an EPROM, an EEPROM or a FLASH memory, having electronically readable control signals stored thereon, which cooperate (or are capable of cooperating) with a programmable computer system such that the respective method is performed.

Instructions may be executed by one or more processors, such as one or more central processing units (CPU), digital signal processors (DSPs), general purpose microprocessors, application specific integrated circuits (ASICs), field programmable gate (or logic) arrays (FPGAs), or other equivalent integrated or discrete logic circuitry. Accordingly, the term "processor," as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The above described exemplary embodiments are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A data message authentication system, comprising:
   a sender device configured to send at least one data message including a first data message comprising a plurality of data segments, the sender device comprising:
      a first sequence generator configured to generate a first sequence representative of an intra-message pattern, wherein the first sequence is a sequence of bits and the intra-message pattern is a bit pattern of the sequence of bits that comprises first bit values and second bit values;
      a first parsing processor configured to receive data of the first data message of the at least one data message, receive the first sequence from the first sequence generator, select a subset of data segments from the data of the first data message based on the intra-message pattern, and output the selected subset of data segments,
      wherein the first parsing processor is configured to associate each of the plurality of data segments of the first data message to a different corresponding bit of the sequence of bits, extract data segments from the plurality of data segments that are associated with the first bit values to be used as the selected subset of data segments, and discard data segments from the of the plurality of data segments that are associated with the second bit values;
      a first tag generator configured to receive the selected subset of data segments from the first parsing processor and generate a first authentication tag using the selected subset of data segments, wherein the first authentication tag is associated with the data of the first data message; and
      a transmitter configured to transmit the first data message, including the plurality of data segments, with the first authentication tag.

2. The data message authentication system of claim 1, wherein the first sequence generator is a random sequence generator, the first sequence is a random bit sequence, and the intra-message pattern is a randomized intra-message pattern comprising a randomized intermixing of the first bit values and the second bit values.

3. The data message authentication system of claim 1, wherein the sender device further comprises:
   a data classifier configured to determine a traffic class of the data of the first data message from a predetermined set of traffic classes, and select a message verification scheme from a plurality of message verification schemes based on the determined traffic class.

4. The data message authentication system of claim 3, wherein the sender device further comprises:
   a data pre-filter configured to select data components from the data of the first message based on the determined traffic class, and output pre-filtered data to be used as the data of the first data message.

5. The data message authentication system of claim 3, wherein the data classifier is configured to determine a number of bits of the first sequence based on the determined traffic class and to configure the first sequence generator to generate the first sequence having the determined number of bits.

6. The data message authentication system of claim 1, wherein the tag generator applies a hash function to the selected subset of data segments to generate the first authentication tag.

7. The data message authentication system of claim 6, wherein the first authentication tag is a message authentication code (MAC).

8. The data message authentication system of claim 1, wherein:
   in response to the data message authentication system being powered on, the first sequence generator is configured to generate a different first sequence representative of a different intra-message pattern, wherein the first sequence generator is configured to change the sequence of bits to a different sequence of bits to create the different intra-message pattern, wherein the different intra-message pattern is a bit pattern of the different sequence of bits that comprises the first bit values and the second bit values, and
   the first parsing processor is configured to select data segments from a plurality of data segments of a second data message of at least one data message based on the different first sequence,
   wherein the first parsing processor is configured to associate each of the plurality of data segments of the second data message to a different corresponding bit of the different sequence of bits, extract data segments from the plurality of data segments of the second data message that are associated with the first bit values to be used as a selected subset of data segments of the second data message, and discard data segments of the plurality of data segments of the second data message that are associated with the second bit values, wherein the first tag generator is configured to receive the selected subset of data segments of the second data message from the first parsing processor and generate a second authentication tag using the selected subset of data segments of the second data message, wherein the second authentication tag is associated with the second data message, and wherein the transmitter is configured to transmit the second data message, including the plurality of data segments of the second data message, with the second authentication tag.

9. The data message authentication system of claim 8, wherein the first sequence generator is a random sequence generator, the first sequence is a random bit sequence, the intra-message pattern is a randomized intra-message pattern comprising a randomized intermixing of the first bit values and the second bit values, the different first sequence is a different random bit sequence, and the different intra-message pattern is a different randomized intra-message pattern comprising a different randomized intermixing of the first bit values and the second bit values.

10. The data message authentication system of claim 1, further comprising:
a receiver device configured to authenticate the at least one data message, the receiver device comprising:
a receiver configured to receive the first data message with the first authentication tag from the transmitter;
a second sequence generator configured to generate the first sequence with the sequence of bits matching the intra-message pattern generated by the first sequence generator;
a second parsing processor configured to receive the data of the first data message from the receiver, receive the first sequence from the second sequence generator, select the subset of data segments from the data of the first data message based on the intra-message pattern, and output the selected subset of data segments,
wherein the second parsing processor is configured to associate each of the plurality of data segments of the first data message to a different corresponding bit of the sequence of bits, extract data segments from the plurality of data segments that are associated with the first bit values to be used as the selected subset of data segments, and discard data segments from the of the plurality of data segments that are associated with the second bit values;
a second tag generator configured to receive the selected subset of data segments from the second parsing processor and generate a recalculated first authentication tag using the selected subset of data segments from the second parsing processor, wherein the recalculated first authentication tag is associated with the data of the first data message; and
a comparator configured to compare the first authentication tag from the receiver with the recalculated first authentication tag, and generate a validation signal based on a comparison result of the first authentication tag and the recalculated first authentication tag.

11. The data message authentication system of claim 10, wherein:
the sender device further comprises a first controller,
the receiver device further comprises a second controller, and
the first controller and the second controller are configured to synchronize the first sequence generator and the second sequence generator such that the first sequence generator and the second sequence generator generate the first sequence.

12. The data message authentication system of claim 10, wherein:
the sender device is configured to send a plurality of data messages, including the first data message,
wherein the first tag generator is configured to generate a corresponding authentication tag for each of the plurality of data messages, and
the transmitter is configured to transmit the plurality of data messages each with the corresponding authentication tag.

13. The data message authentication system of claim 12, wherein the receiver device further comprises:
a third sequence generator configured to generate a second sequence representing an inter-message pattern; and
a third parsing processor configured to receive the plurality of data messages from the sender device, select a subset of data messages from the plurality of data messages for authentication based on the inter-message pattern, and forward the selected subset of data messages to the second parsing processor for authentication, wherein a non-selected subset of data messages from the plurality of data messages are not authenticated by the receiver device.

14. The data message authentication system of claim 13, wherein:
the second parsing processor is configured to select a subset of data segments from each data message of the selected subset of data messages based on the intra-message pattern, and output the selected subset of data segments for each data message of the selected subset of data messages, and
the second tag generator is configured to receive the selected subset of data segments for each data message of the selected subset of data messages and generate a recalculated authentication tag for each data message of the selected subset of data messages based on the selected subset of data segments for each data message of the selected subset of data messages.

15. The data message authentication system of claim 14, wherein:
the third parsing processor configured to receive a plurality of authentication tags, including the corresponding authentication tag for each of the plurality of data messages, from the sender device, select a subset of authentication tags from the plurality of authentication tags based on the inter-message pattern, and forward the selected subset of authentication tags to the comparator, and
the comparator is configured to compare recalculated authentication tags from the second tag generator with the selected subset of authentication tags.

16. The data message authentication system of claim 1, wherein the first tag generator generates the first authentication tag by applying a tag generating algorithm to the selected subset of data segments to convert the selected subset of data segments into the first authentication tag.

17. The data message authentication system of claim 16, wherein the sender device further comprises:
a data classifier configured to determine a traffic class of the data of the first data message from a predetermined set of traffic classes,
wherein the first tag generator is configured to select the tag generating algorithm from a plurality of tag generating algorithms according to the determined traffic class, wherein the first tag generator stores a mapping of traffic classes and tag generating algorithms in which each of the predetermine set of traffic classes corresponds to one of the plurality of tag generating algorithms.

18. A data message authentication system in a vehicle communication network, comprising:
a receiver device configured to authenticate a plurality of data messages, the receiver device comprising:
a receiver configured to receive a data message of the plurality of data messages with an authentication tag that corresponds to the data message;
a first sequence generator configured to generate a first sequence representative of an intra-message pattern, wherein the first sequence is a sequence of bits and the intra-message pattern is a bit pattern of the sequence of bits that comprises first bit values and second bit values;
a first parsing processor configured to receive data of the data message, receive the first sequence from the first sequence generator, select a subset of data segments from the data of the data message based on the intra-message pattern, and output the selected subset of data segments,
wherein the first parsing processor is configured to associate each data segment of a plurality of data segments of the data message to a different corresponding bit of the sequence of bits, extract data segments from the plurality of data segments that are associated with the first bit values to be used as the selected subset of data segments, and discard data segments from the of the plurality of data segments that are associated with the second bit values;
a tag generator configured to receive the selected subset of data segments from the first parsing processor and generate a recalculated authentication tag using the selected subset of data segments, wherein the recalculated authentication tag corresponds to the data of the data message; and
a comparator configured to compare the authentication tag from the receiver with the recalculated authentication tag to generate a comparison result, and generate a validation signal based on the comparison result indicating whether or not the authentication tag and the recalculated authentication tag are the same.

19. The data message authentication system of claim 18, wherein the receiver device further comprises:
a second sequence generator configured to generate a second sequence representing an inter-message pattern, wherein the second sequence is a second sequence of bits and the intra-message pattern is a bit pattern of the second sequence of bits that comprises first bit values and second bit values; and
a second parsing processor configured to receive the plurality of data messages, select a subset of data messages from the plurality of data messages for authentication based on the inter-message pattern, and forward the selected subset of data messages to the first parsing processor,
wherein the second parsing processor is configured to associate each of the plurality of data messages to a different corresponding bit of the second sequence of bits, extract data messages from the plurality of data messages that are associated with the first bit values to be used as the selected subset of data messages, and bypass authentication of data messages from the of the plurality of data messages that are associated with the second bit values.

20. The data message authentication system of claim 19, wherein:
the first parsing processor is configured to select a subset of data segments from each data message of the selected subset of data messages based on the intra-message pattern, and output the selected subset of data segments for each data message of the selected subset of data messages, and
the tag generator is configured to receive the selected subset of data segments for each data message of the selected subset of data messages and generate a recalculated authentication tag for each data message of the selected subset of data messages based on the selected subset of data segments for each data message of the selected subset of data messages.

21. A method of authenticating data messages in a vehicle communication network, the method comprising:
generating, at a sender device, a first sequence representative of an intra-message pattern, wherein the first sequence is a sequence of bits and the intra-message pattern is a bit pattern of the sequence of bits that comprises first bit values and second bit values;
selecting, at the sender device, a subset of data segments from data of a data message based on the intra-message pattern, and output the selected subset of data segments, where selecting the subset of data segments includes associating each of a plurality of data segments that make up the data of the data message to a different corresponding bit of the sequence of bits, extracting data segments from the plurality of data segments that are associated with the first bit values to be used as the selected subset of data segments, and discarding data segments from the of the plurality of data segments that are associated with the second bit values;
generating, at the sender device, an authentication tag using the selected subset of data segments, wherein first authentication tag corresponds to the data of the data message; and
transmitting, from the sender device, the data message, including the plurality of data segments, with the authentication tag.

22. The method of claim 21, further comprising:
receiving, at a receiver device, the data message with the authentication tag;
generating, at the receiver device, the first sequence representative of the intra-message pattern;
selecting, at the receiver device, the subset of data segments from the data of the data message based on the intra-message pattern, wherein selecting the subset of data segments includes associating each of the plurality of data segments of the data message to a different corresponding bit of the sequence of bits, extracting data segments from the plurality of data segments that are associated with the first bit values to be used as the selected subset of data segments, and discarding data segments from the of the plurality of data segments that are associated with the second bit values;
generating, at the receiver device, a recalculated authentication tag based on the selected subset of data segments selected at the receiver device, wherein the recalculated authentication tag corresponds to the data of the data message;

comparing, at the receiver device, the received authentication tag with the recalculated first authentication tag to generate a comparison result; and generating, at the receiver device, a validation signal based on the comparison result indicating whether or not the received authentication tag and the recalculated authentication tag are the same.

23. The method of claim 21, further comprising:

receiving, at a receiver device, a plurality of messages each with a corresponding authentication tag from the sender device; and generating, at the receiver device, a second sequence representing an inter-message pattern; and selecting a subset of data messages from the plurality of data messages for authentication, wherein a remaining subset of data messages of the plurality of data messages are not authenticated.

* * * * *